Patented May 22, 1934

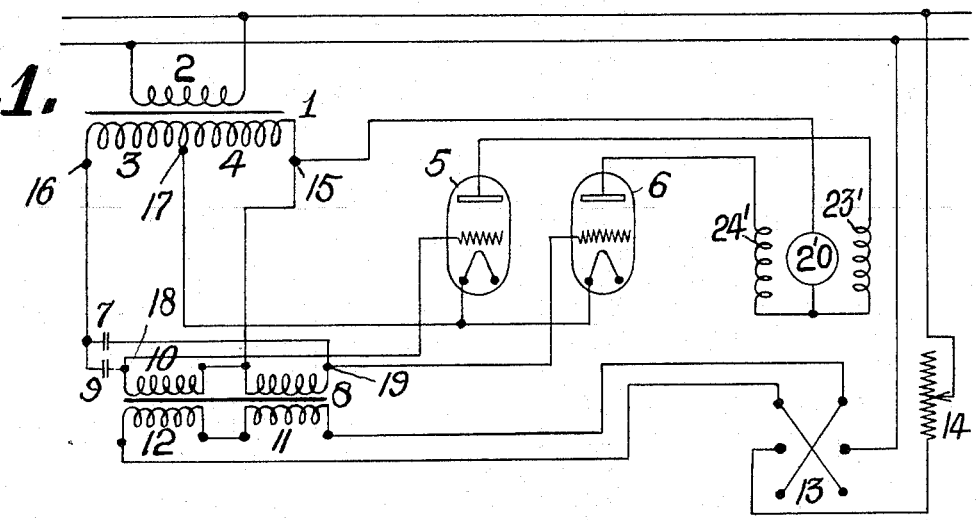
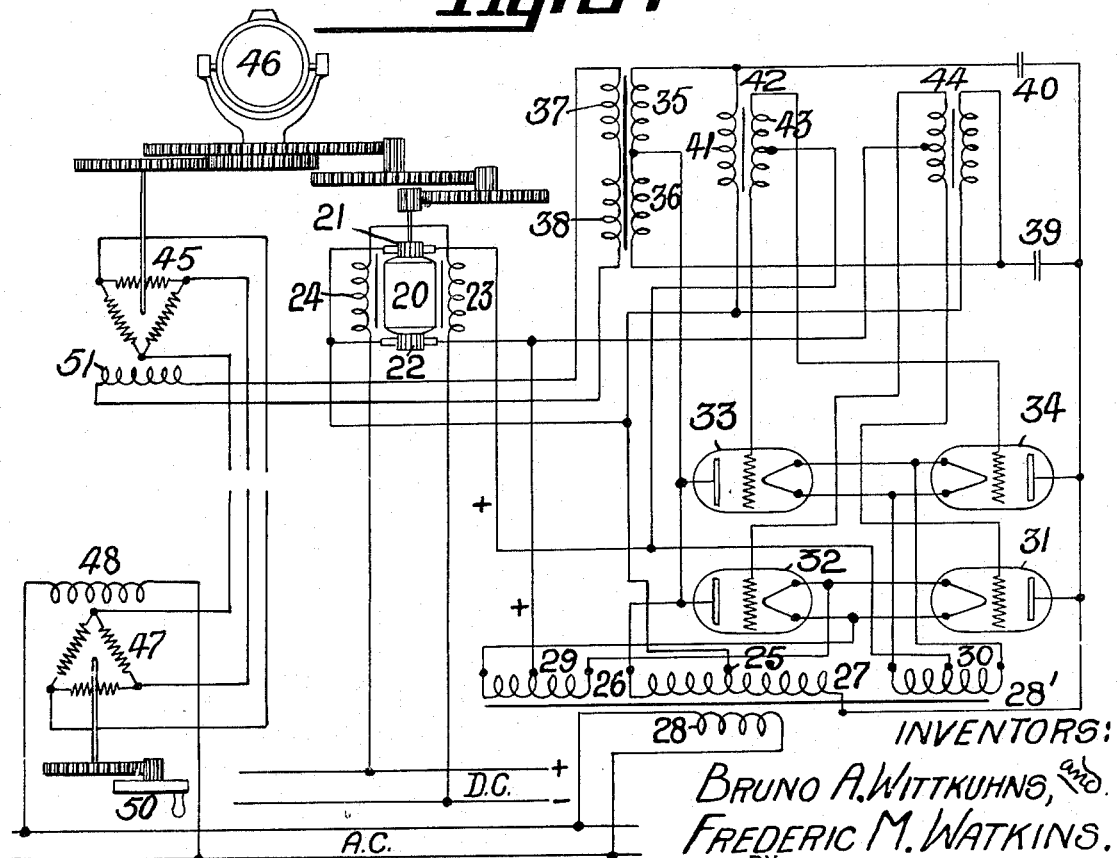

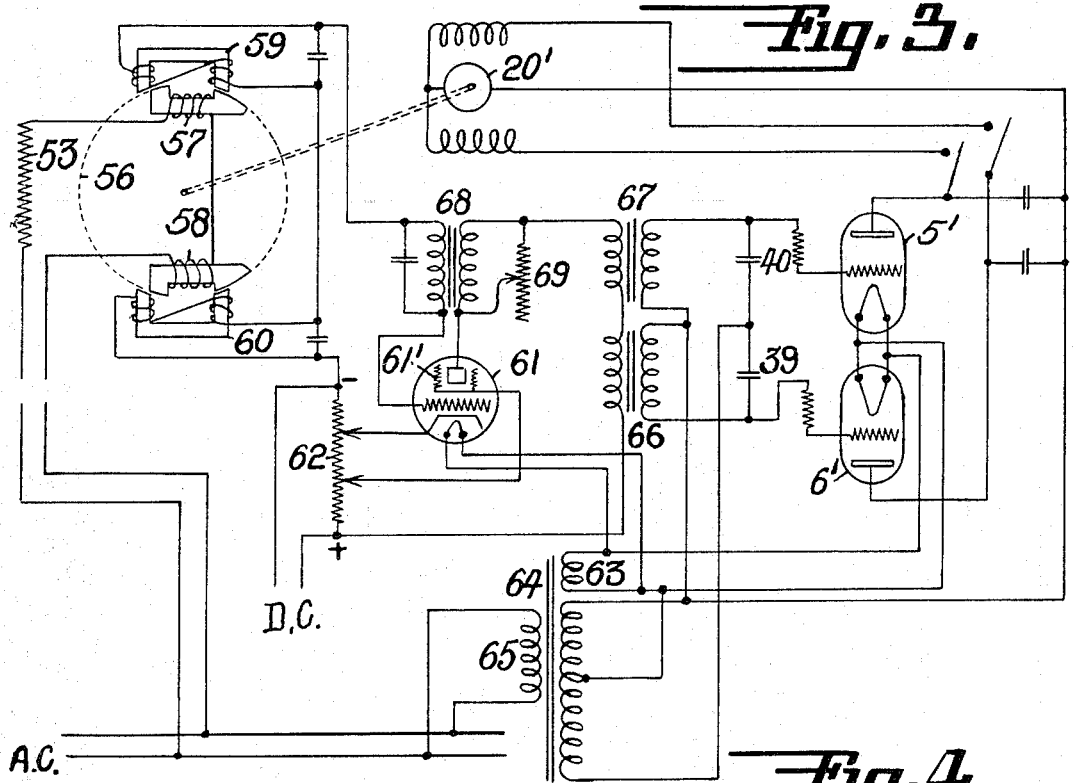
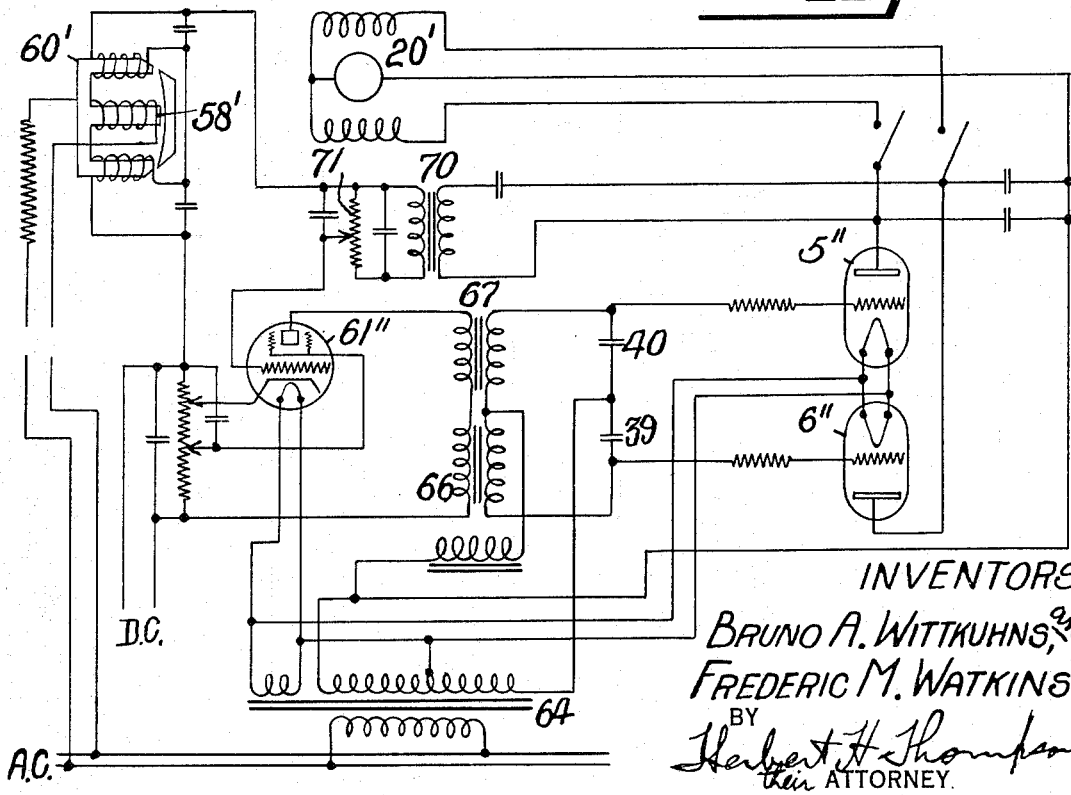

1,959,805

UNITED STATES PATENT OFFICE 1,959,805

FOLLOW-UP OR REMOTE CONTROL SYSTEM

Bruno A. Wittkuhns, Summit, N. J., and Frederic M. Watkins, Forest Hills, N. Y., assignors to Sperry Gyroscope Company, Inc., Brooklyn, N. Y., a corporation of New York Application April 1, 1932, Serial No. 602,470

10 Claims. (Cl. 172—239)

This invention relates to improvements in the positional control of objects by electrical means and has application both to so-called follow-up systems and to the control at a distance of the position of a rotary object, such as a searchlight or gun. More particularly our invention is an improvement in said systems employing grid-controlled rectifier or grid-glow tubes, the output of which drives a reversible power motor to turn the controlled object, as disclosed in our prior applications Serial No. 547,872 filed June 30, 1931 for Variable speed motor control and also in the sole application of Bruno A. Wittkuhns, one of the joint applicants, Serial No. 564,817 filed September 24, 1931 for Positional control of heavy objects. Such a system may readily be controlled by oppositely shifting the phase on the grids of a pair of grid-glow tubes and driving an ordinary commutator motor from the output thereof across the main A. C. power supply. According to our present invention we have simplified the methods previously employed for effecting such purpose and reduced the number of tubes without the loss of sensitivity.

Referring to the drawings showing several embodiments of our invention,

Fig. 1 is a simplified wiring diagram illustrating the theory of operation of our improved circuits.

Fig. 2 shows a complete wiring diagram of our invention as applied to the remote control of an object, such as a searchlight from a sending station.

Fig. 3 shows a wiring diagram of our invention as applied to the follow-up system of a sensitive element, such as a gyro compass.

Fig. 4 shows a modified form of our invention for the control of a follow-up system.

The theory of operation of our invention may be the best understood by referring first to Fig. 1 which illustrates the fundamental circuit employed in all of the other figures. In this figure, 1 is a transformer whose primary winding 2 is fed from a line supply of A. C. Its secondary windings 3 and 4 are connected together so that they constitute a center tapped winding. A bridge circuit consisting of condenser or other reactance 7 and transformer winding 8 is connected across the center tapped winding 3, 4 of transformer 1. A second bridge of the same design consisting of a condenser or other reactance 9 and transformer winding 10 is also connected across the same center tapped winding. The other windings 11 and 12 of said transformers are connected in series and are supplied from said source of A. C. through the double pole, double throw switch 13 and the adjustable rheostat 14 representing any form of controller. The transformer windings 8 and 10 operate in the circuit mainly as resistances, the inductive action being secondary and outweighed by the resistance factor. This is due to the fact that the A. C. currents, through these windings due to the potential 15, 16, neutralize each other, as they are equal and opposite. As a matter of fact, the transformer windings 8, 10, 11 and 12 may be wound on a single core and it is obvious then that the current flowing from terminal 15 of the windings 3 and 4 to the midpoint between winding 8 and 10 would split evenly at that point and one-half of the current would go through winding 10 and condenser 9 back to terminal 16, while the other half would flow through windings 8 and condenser 7 to terminal 16. If the ohmic resistance of the two windings 8 and 10 is alike and if the impedance of the two condensers 9 and 7 are also equal, then equal amounts of current would flow in both branches, and as the currents are of opposite directions their magnetizing effect on the core would be zero. This means that there would be no inductance left in the winding, but only their ohmic resistance.

It, therefore, is permissible to consider the windings 8 and 10 as pure ohmic resistances. If this is true, then we have across the windings 3 and 4 two bridges, each consisting of a resistance connected in series with a condenser. Any change in either the condenser or the resistor means that the phase of the potential between points 17 and 18 or 19. respectively, will change its angle relative to the phase of the potential between points 15 and 16. It is possible, by changing, for instance, the resistance from 0 to infinity to rotate the phase of the potential between 17 and 18 or 19 through an angle of 180°. The means for changing the resistances of the windings 8 and 10 are given by the primary windings 11 and 12. If an A. C. which may be in phase with potential between 15 and 16 is sent through the windings 11 and 12, then in the winding 8 as well as the winding 10 two potentials are induced of equal phase and equal magnitude. However, as the bridge current is flowing through the same two windings in opposite directions, the resultant voltage drops across the two windings 8 and 10 will be different. For instance, the voltage drop across coil 8 might be increased, the one across coil 10 might be decreased, because in one case the two potentials will be subtracted, and in the other case they will be added. It is possible to so adjust the current through the windings 11 and 12 that there will be zero potential, for instance, across coil 8, which will mean that there is zero current flowing. In this case, the induced voltage in winding 8 would have to be exactly equal to that between points 15 and 16 and of such a phase as to just balance this potential. If there is no current flowing through coil 8, then its resistance can be considered to be infinity. On the other hand, if the primary current through coils 12 and 11 is reversed, the resistance of the coil will be reduced due to the fact that the induced voltage will add to that between 15 and 16 and will cause a larger current to flow through the winding 8.

It is obvious, however, that it will only be possible to get zero resistance of that coil if the current could be increased to infinity. However, the change in the resistance of the coil 8 from infinity down to a variable of one-fourth or less of its original value can be accomplished, and this will result in a considerable change of the phase of the potential between points 17 and 18. The same thing happens on windings 10 and 12, but always in the opposite sense, so that while the resistance of coil 8 is infinity, that of coil 10 has been reduced below its normal value. If we now connect the grid of grid-glow tube 5 to point 18 and its filament to point 17, the potential between 17 and 18 will be the grid potential of tube 5 and if the current through rheostat 14 is changed, this change will result in a shift of the phase of the grid voltage on tube 5 relative to its plate voltage, because the plate voltage of the tube is in phase with the potential between 15 and 16, but only of one-half of its value.

The grid-glow tube 6 is controlled in a similar way by the potentiometer between 19 and 17. Therefore, if the current through rheostat 14 is changed, one tube will increase its plate current while the other tube will decrease the plate current, and this condition will be reversed if the double pole switch 13 is reversed. A series wound D. C. motor 20' with two separate field coils 23', 24', which are opposite in their effects upon the armature, may be connected to the tubes 5 and 6 in such a way that the current from one tube goes through one field coil while the current from the other tube goes through the other field coil and that the sum of both currents go through the armature. In this case the armature will always carry the full current of both tubes together, while the direction of the field flux is controlled by the tube which has the highest current. In other words, the motor may be reversed by controlling the voltage sent through the coils 11 and 12.

The two grid-glow tubes shown in Fig. 1 are connected to serve as half-wave rectifiers. It is, however, possible to use, instead of each tube, two tubes connected as full wave rectifiers, as indicated in Fig. 2. Fig. 2 also shows a special means of providing controlling impulses for a reversible power motor. 20 is the armature of a double commutator D. C. motor which has two separate armature windings, each with its own commutator. One winding is connected to commutator 21, the other one to commutator 22. Two field coils 23 and 24 are connected to a D. C. supply, so that the motor has a constant field. One of the brushes on commutator 21 is connected to one of the brushes on commutator 22 and both are connected to the center point 25 of a transformer winding 26, 27. This transformer winding is on a common core with a primary 28 and two filament heater windings 29 and 30, both center tapped. The primary is connected to a source of A. C. supply. We have shown four rectifier tubes 31, 32, 33 and 34, two of which work together in full wave fashion. 31 and 32 have as their common filament supply winding 29 on transformer 28'. The center point of winding 29 is at the positive terminal of the rectified current supplied by the tubes 31 and 32. The negative terminal is at the center point 25 of the winding 26, 27, which also is the common line for two brushes on the two commutators 21, 22 of the motor 20. Tubes 33 and 34 form a second pair of full wave rectifiers, getting their plate supply from the same center point winding 26—27 but having a separate filament supply winding transformer 30, the center point of which is the positive terminal for their rectified output, the negative terminal being the same point 25 as before. The center tap of winding 29 is connected to the other brush of commutator 22, while the center point of winding 30 is connected to the second brush on commutator 21, so that if the tubes are active, current will flow through both commutators and back through the common connection to point 25.

The rectifiers are controlled by a device which is in principle identical with that shown in Fig. 1. There are one or more transformers with windings 35, 36, 37 and 38, of which 37 and 38 are connected in series, while the 35 and 36 windings are connected in parallel and each of them is in series with a condenser 40 and 39, respectively, across the terminals 26, 27 of the center tapped winding of the supply transformer 28'. Between winding 35 and condenser 40 is connected the center tap 25 of winding 26, 27 through the primary winding 41 of a transformer 42. The phase of the voltage in this transformer winding 41 can shift with respect to the phase of the potential between 26, 27 if the current through the winding 35 is changed. The secondary winding 43 of transformer 42 is center tapped and has one of each of its outer terminals connected to the grid of tubes 33, 34 respectively, the center tap being connected to the center point of winding 30, or, what amounts to the same thing, to the filaments of the tubes 33 and 34. Therefore, the potentials used in each half of the winding 43 serve as grid potentials on the tubes 33, 34. Due to the fact that their plates are connected to the opposite ends of the secondary transformer windings, their plates have opposite potentials at any given time. It, therefore, is necessary to supply the grid of one tube with a potential which is equal and opposite to that which is at the same instant applied to the grid of the other tube. Also, if the phase angle of the voltage on one grid is shifted, it should shift in the same direction on the grid of the second tube in order to keep the load in both tubes equal for one full cycle so that one tube will pass a given amount of current through the first half cycle and be inactive during the second half cycle, and the other tube will be inactive during the first half cycle and will pass an equal amount of current through the second half cycle. This result is secured by having the winding 43 center tapped and connected to the filaments. The voltages induced in that winding between the center tap and one end are equal and opposite to those induced in the other half of the winding and the shift of the phase angle of the voltage through winding 41 will be the same in both of the secondary windings 43.

For the second pair of tubes 31 and 32, there is preferably the same arrangement, using the transformer 44 to provide, split and shift the grid voltages for those two tubes in proper fashion. It is readily seen that transformer 44 is connected to the other half of the bridge circuit.

The input to the transformer winding 37 and 38 may be provided from an A. C. self-synchronous repeater motor or generator 45. The motor is geared, say, 1 to 1, to the searchlight 46, which in turn is connected by gears to the motor 20 so that it will turn when the motor 20 is running. Motor 45 has three interconnected single-phase windings of its rotor connected to three similar windings on the rotor of an A. C. generator 47, or transmitter. Such self-synchronous transmitters and repeater motors are frequently termed "selsyns", a word coined by taking the first three letters of "self" and "synchronous". The field winding 48 of selsyn 47 is energized as usual from the A. C. line supply. A handwheel 50, or other means for rotating the same, is geared to the rotor of transmitter 47 so that it can be turned to any desired angle by hand. The motor 45 has its field winding 51 connected in series with windings 37 and 38, so that any voltage induced in these windings from the rotor will result in a current through coils 37 and 38.

In the neutral or balanced position of the selsyns and the motor 20, there will be no voltage induced in coil 51 and there will be no current flowing in coils 37 and 38. Therefore, the bridge system, consisting of coils 35 and 36, as well as condensers 39 and 40, is balanced and all tubes pass an equal amount of current, which is only determined by the relative impedance of the condensers 39 and 40. As soon as the handwheel 50 turns the rotor of generator 47, the single phase 3-wire system of this rotor becomes unbalanced and produces currents in its armature which also produces currents through the armature of motor 45, thereby effecting a change in the field 51 producing the signal current. This change of the field vector is proportional to the number of degrees through which the rotor of selsyn 47 has been turned, and it will produce a voltage in the coil 51 which is roughly proportional to the number of degrees through which selsyn 47 has been turned. In other words, it starts from 0 up to a maximum, which is reached after selsyn 47 has been turned through 90°. The voltage, furthermore, will change its phase 180° if it goes through zero, which means, if the rotor of selsyn 47 is turned from its neutral position in which there is no current induced in coil 51 to one side, a voltage will be induced which is 180° out of phase with a voltage which is induced in coil 51 if the rotor of selsyn 47 is turned in opposite direction. It, therefore, is obvious that turning the rotor of selsyn 47 is equivalent to throwing switch 13 in Fig. 1, either one way or the other, and that further turning of the rotor in the same direction is equivalent to reducing the amount of resistance on the rheostat 14 in Fig. 1.

The description of Fig. 1 reveals the facts why a change of voltage and a change of phase of the voltage across the coils 37 and 38 will result in one set of the tubes increasing its current while the other set of tubes decreases its current. Suppose, for instance, that the rotor of selsyn 47 has been turned until tubes 33 and 34 pass twice as much current as tubes 31 and 32. This will mean that through the commutator 21 and its armature winding is passing twice as much current than through commutator 22 and its own armature winding. The motor, therefore, will turn in the direction governed by the stronger current and will start to turn the searchlight 46 and at the same time the rotor of selsyn 45. The direction of rotation should be such as to restore rotor 45 to such a position where there will be no voltage induced in coil 51, at which point the motor will stand still because the current through the tubes has been again equalized.

Fig. 3 shows a similar system of the same principle as applied to a follow-up system on a compass. The thyratrons 5' and 6' are here controlled in a manner and by a circuit which is identical with that shown in Fig. 1 and, therefore, require no further explanation. Neither do we have to explain the action of the tubes on the motor 20'. The motor 20' is, through gears, connected to the phantom element 56 of a compass, the details of which are not shown. Two cored windings 57 and 58 are connected in series with a resistance 53 and A. C. supply. These cores are mounted on the sensitive element of the compass, while the U-shaped cores 59 and 60 are mounted on the phantom element which, as stated, is driven from motor 20'. A secondary potential is induced in the windings on the cores 59 and 60, these potentials being of opposite phase and connected in such a way that they neutralize each other in the position shown in the drawings. If, however, the sensitive element and the phantom element are not properly lined up, there will be a higher potential induced in one of the two transformers than in the other one, and the differential output of the two will, by its amplitude and phase, be in proportion to the amount and direction of the misalignment between the two members. If the misalignment occurs to the other side of the center position, the phase of the output voltage will reverse 180°. This controlling potential is applied to the control grid of a vacuum tube 61 and to the cathode of the same tube. This tube has a D. C. supply by means of a potentiometer 62, which is placed across the terminals of the D. C. supply. Its filament is heated from a winding 63 on a transformer 64, which is energized through its primary 65 from the main A. C. supply. The cathode of the tube 61 and its screen grid 61' are both connected to sliders on the potentiometer 62, the sliders having positions which will provide correct voltages for grid bias and screen voltage. The plate current for the tube 61 is taken from the positive terminal of the potentiometer 62 and passes through two transformers 66 and 67 and through a third transformer 68 before it reaches the plate. Any A. C. signal coming from the transformers 59 and 60 and getting to the grid of the tube 61 would produce an A. C. of equal phase and frequency in the plate circuit of the tube where it will induce potentials in the respective windings of the transformers 67 and 66. The potentials and current flowing through 66 and 67 have the opposite effect on the thyratrons 5' and 6' as in Fig. 2 until the current is again balanced and the motor stops.

In order to prevent the motor from stopping before it reaches perfect alignment, which might very well happen due to friction and the inability of very small currents in the thyratron to overcome the same, it has been found desirable to introduce a mechanical oscillation into the motor and the gears between motor and phantom element. This mechanical oscillation is produced electrically, preferably as described in prior patent applications. We prefer, in this case to create the oscillation by using the tube 61 as an oscillator so that it acts simultaneously as amplifier and oscillator. We make the tube oscillate at a frequency well below the frequency of the A. C. supply, preferably between 10 and 20 cycles per second. This is accomplished by providing a close coupling between plate and grid circuits of this tube and by tuning one of these circuits to the desired frequency, or to such a frequency which will produce with the supplied frequency an oscillation of desired low frequency. An adjustable rheostat 69 serves the purpose of regulating the amplitude of this oscillation and thereby the amplitude of the mechanical oscillation of the motor. The oscillation also prevents hunting of the motor by breaking up the surging impulses in the system into the short impulses of the oscillation, so that no heavy surge can build up.

Fig. 4 shows a similar follow-up system on a different type of compass. The main difference is that the oscillation is not created in the first tube 61, but that an impulse is being fed from the plates of the tubes 5″ and 6″ to the grid circuit of tube 61″. A transformer 70 is tuned either on the primary or secondary side or on both sides to produce the desired frequency oscillation which then is superimposed on the signal, which has to pass through more or less resistance of the potentiometer 71. Also, all windings on the controlling cores are in this instance placed on the follow-up or power driven core 60′, the core 58′ on the sensitive element being without windings.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a remote control for reversible commutator motors, an A. C. supply, a transformer actuated therefrom and having a mid tap, a transformer winding and a reactance connected in series across said first transformer output, a second transformer winding and a reactance oppositely connected across said output, a closely coupled winding for each of said other windings and normally excited from said supply, means for varying at will the current therethrough, a grid-glow tube connected between each of said first-named windings and the mid tap on the supply transformer, whereby the phase on the grids thereof is oppositely varied with respect to the phase on the plates as said current varies and a reversible commutator motor actuated by the output of said tubes.

2. In a remote control for reversible commutator motors, an A. C. supply, a transformer actuated therefrom and having a mid tap, a transformer winding and a reactance connected in series across said first transformer output, a second transformer winding and a reactance oppositely connected across said output, a closely coupled winding for each of said other windings, a controller adapted to produce signals excited from said supply and coupled to said last-named windings, a grid-glow tube connected between each of said first-named windings and the mid tap on the supply transformer, whereby the phase on the grids thereof is oppositely varied with respect to the phase on the plates as said current varies and a reversible commutator motor actuated by the output of said tubes.

3. In a remote control for power motors, a pair of grid-glow tubes having their plates connected to drive the motor in opposite directions, a differential transformer controller, a vacuum tube controlled by said controller, a multi-wound transformer having the primaries thereof connected with the output of said tube, oppositely wound secondaries, and a common A. C. supply for said grid-glow tubes said multi-transformer, and said controller the opposite terminals of said transformer being connected one between a grid and cathode of one of said grid glow tubes and the other similarly connected to the other of said grid glow tubes, and means interposed in said connections for causing the variable signals from said transformer windings to oppositely shift the phases of the grids of said tubes with respect to the plate voltage whereby changes in the position of the controller governs the direction and torque of the motor by shifting the phase of the grid voltage with respect to that of the plate of the glow tubes.

4. In a remote control for power motors, a pair of grid-glow tubes having their plates connected to drive the motor in opposite directions, a differential controller, a vacuum tube controlled by said controller, a multi-wound transformer having the primaries thereof connected with the output of said tube, and oppositely wound secondaries, a common A. C. supply for said grid-glow tubes said multi-transformer, and said controller the grids of said grid glow tubes being connected to the output of said secondaries, and an oscillator in circuit with said vacuum tube for preventing hunting of the motor without producing a dead region.

5. In a positional or follow-up control for power motors for positioning an object with respect to the position of a controlling object, means for producing an electro-motive force varying in magnitude and direction with the position of said controlled object, a pair of grid-glow tubes, a phase shifting device between said means and said tubes variable with the output of said means, comprising a multi-wound transformer having primaries excited from said first-named means and the A. C. supply, opposed secondaries having reactances in series therewith and a center tapped transformer excited from said supply connected to said secondaries, said phase shifting device being connected between the grid of each tube and the cathode thereof to shift the phase thereof with respect to the phase on the plate of the respective tube and a reversible commutator motor governed as to direction and torque by the output of said tubes.

6. In a positional or follow-up control for power motors for positioning an object with respect to the position of a controlling object, means for producing an electro-motive force varying in magnitude and direction with the position of said controlled object, a pair of grid-glow tubes, a phase shifting device between said means and said tubes variable with the output of said means, comprising a multi-wound transformer having primaries excited from said first-named means and the A. C. supply, opposed secondaries having reactances in series therewith and a center tapped transformer excited from said supply connected to said secondaries, said phase shifting device being connected between the grid of each tube and the cathode thereof to oppositely shift the phases on the grids with respect to the phases on the plates of said tubes, a reversible commutator motor governed as to direction and torque by the output of said tubes, and an oscillator in circuit with said phase-shifting device for producing rapid oscillations or tremors.

7. In a remote control for power motors, a supply transformer, a pair of grid-glow tubes having their plates connected to drive the motor in opposite directions, a transformer controller, a vacuum tube governed by said controller, a multi-wound transformer having its primaries connected to the output of said tube and opposed secondaries, and reactances in circuit with each of said secondaries and the respective grids of said grid-glow tubes and their respective cathodes such that the phase on the grids with respect to the plates is oppositely shifted upon movements of said controller.

8. Means for driving an object into positional agreement with a controlling object comprising an inductive device, means operated by said controlling object for producing an electromotive force in said inductive device varying in direction and amount in accordance with the movements of said driven object, a pair of grid-glow tubes, a supply transformer, a driving motor for said driven object, a multi-wound transformer and reactances directly connected to said electromotive force and forming together with said supply transformer phase-shifting arrangement for shifting oppositely the phase of the grids with respect to the plates of said grid glow tubes, said motor being driven by the output of said tubes.

9. In a remote control for reversible commutator motors, an A. C. supply, a transformer actuated therefrom and having a mid tap, a transformer winding and a reactance connected in series across said first transformer output, a second transformer winding and a reactance oppositely connected across said output, a closely coupled winding for each of said other windings and normally excited from said supply, means for varying at will the current therethrough, a grid-glow tube connected between said first-named windings and the mid tap on the supply transformer whereby the phase on the grid thereof is varied with respect to the phase on the plate as said current varies, and a reversible commutator motor actuated by the output of said tube.

10. Means for driving an object into positional agreement with a controlling object comprising an inductive device, means operated by said controlling object for producing an electromotive force in said inductive device varying in direction and amount in accordance with the movements of said driven object, a driving motor for said driven object, a grid-glow tube, a supply transformer, a multi-wound transformer and reactances directly connected to said electro-motive force and forming together with said supply transformer a phase-shifting arrangement for shifting the phase of the grid with respect to the plate of said grid glow tube, said motor being driven by the output of said tube.

BRUNO A. WITTKUHNS.
FREDERIC M. WATKINS.